(12) United States Patent
Kamiya et al.

(10) Patent No.: US 9,338,414 B2
(45) Date of Patent: May 10, 2016

(54) IMAGING APPARATUS AND IMAGING METHOD FOR PERFORMING INTERPOLATION PROCESSING

(71) Applicant: SONY CORPORATION, Minato-ku (JP)

(72) Inventors: Koji Kamiya, Kanagawa (JP); Tadamasa Kurashige, Kanagawa (JP); Ryosuke Amano, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/492,565

(22) Filed: Sep. 22, 2014

(65) Prior Publication Data
US 2015/0124114 A1    May 7, 2015

(30) Foreign Application Priority Data

Nov. 5, 2013  (JP) ................. 2013-229011

(51) Int. Cl.
| | | |
|---|---|---|
| H04N 9/09 | (2006.01) | |
| H04N 9/04 | (2006.01) | |
| G06T 3/40 | (2006.01) | |
| H04N 5/347 | (2011.01) | |

(52) U.S. Cl.
CPC .............. *H04N 9/045* (2013.01); *G06T 3/4015* (2013.01); *H04N 5/347* (2013.01); *H04N 9/09* (2013.01); *G06T 2207/10004* (2013.01); *G06T 2207/10024* (2013.01)

(58) Field of Classification Search
CPC .......... G02B 5/04; H04N 9/045; H04N 9/09; H04N 5/347; G06T 3/4015
See application file for complete search history.

(56) References Cited

U.S. PATENT DOCUMENTS

| | | | | | |
|---|---|---|---|---|---|
| 5,168,350 | A * | 12/1992 | Shinozaki | .............. | H04N 9/045 348/262 |
| 5,374,955 | A * | 12/1994 | Furuhata | ................. | H04N 9/045 348/234 |
| 5,726,709 | A * | 3/1998 | Kinoshita | .............. | H04N 9/045 348/264 |
| 5,982,850 | A * | 11/1999 | Nagata | ................... | H04N 9/646 348/265 |
| 6,278,492 | B1 * | 8/2001 | Nakamura | ............. | H04N 5/232 348/262 |
| 7,586,522 | B2 * | 9/2009 | Inoue | ..................... | H04N 5/217 348/222.1 |
| 8,054,353 | B2 * | 11/2011 | Tanifuji | ................. | H04N 3/155 348/282 |
| 2002/0113885 | A1 * | 8/2002 | Inoue | ..................... | H04N 5/217 348/280 |
| 2006/0125842 | A1 * | 6/2006 | Kim | ...................... | G06T 3/4015 345/611 |
| 2007/0222878 | A1 * | 9/2007 | Tanifuji | ................. | H04N 3/155 348/294 |
| 2008/0037906 | A1 * | 2/2008 | Yano | ..................... | H04N 9/045 382/312 |

FOREIGN PATENT DOCUMENTS

| | | |
|---|---|---|
| JP | 61-184057 | 8/1986 |
| JP | 2010-268354 | 11/2010 |

* cited by examiner

*Primary Examiner* — Nicholas Giles

(74) *Attorney, Agent, or Firm* — Oblon, McClelland, Maier & Neustadt, L.L.P

(57) ABSTRACT

An imaging apparatus includes an imaging unit that has image sensors for each image of red, green, and blue which have a two-line addition function respectively. The imaging unit outputs image signals of red and blue and an image signal of green of which sample phases in a space are shifted by one pixel interval in a vertical direction using the two-line addition function. A resolution conversion unit obtains image signals of red, green, and blue of which the number of lines is doubled by performing interpolation processing on the image signals of red and blue and an image signal of green output from the imaging unit.

8 Claims, 8 Drawing Sheets

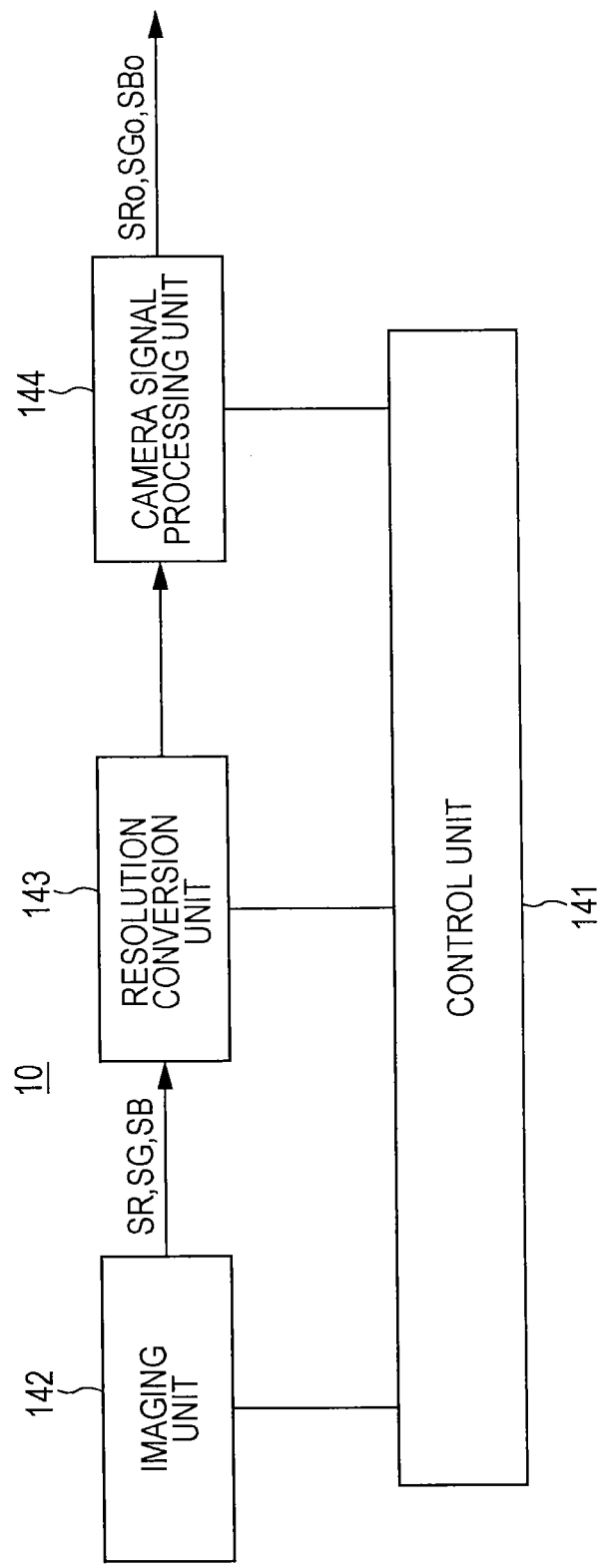

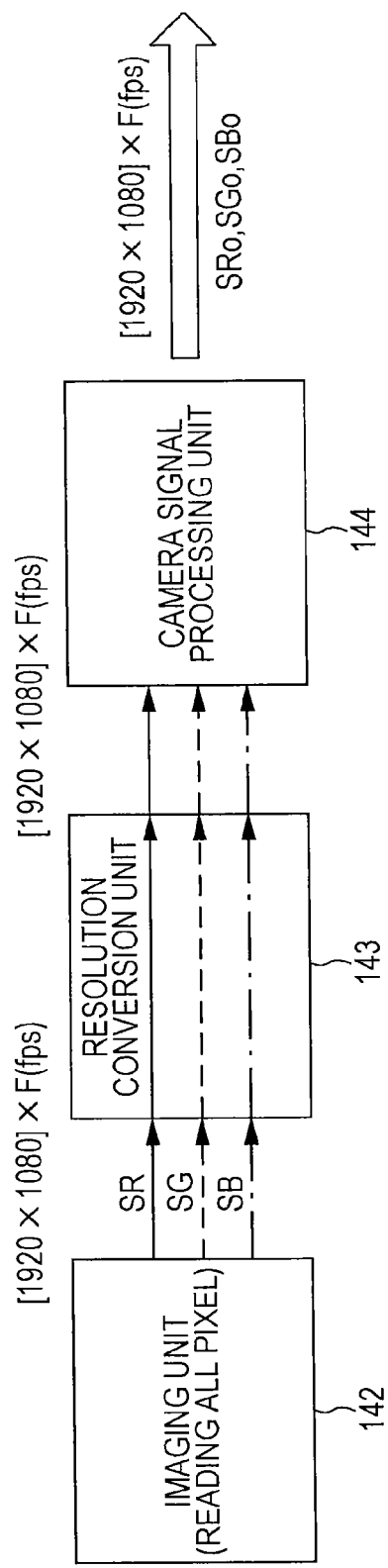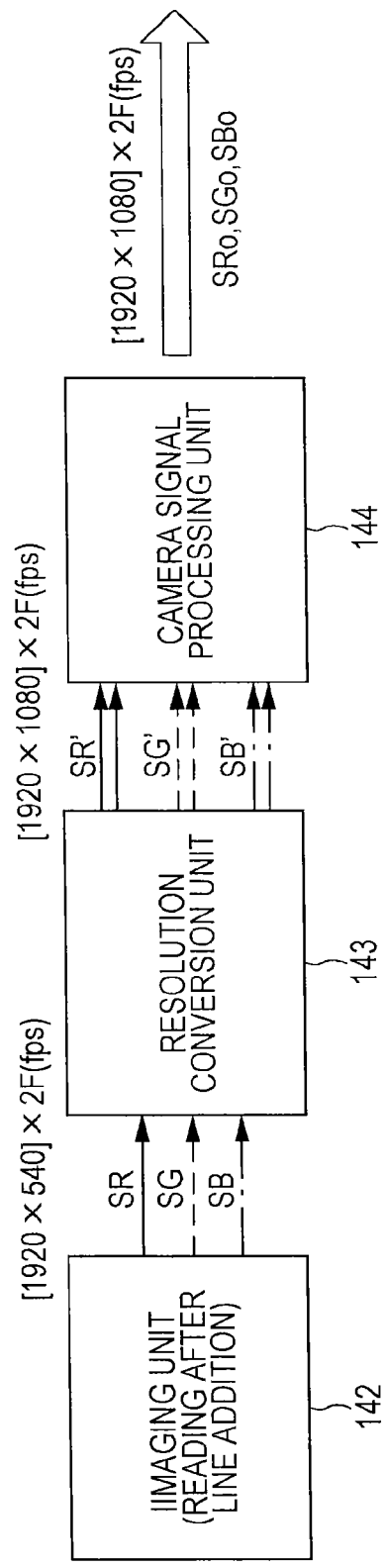

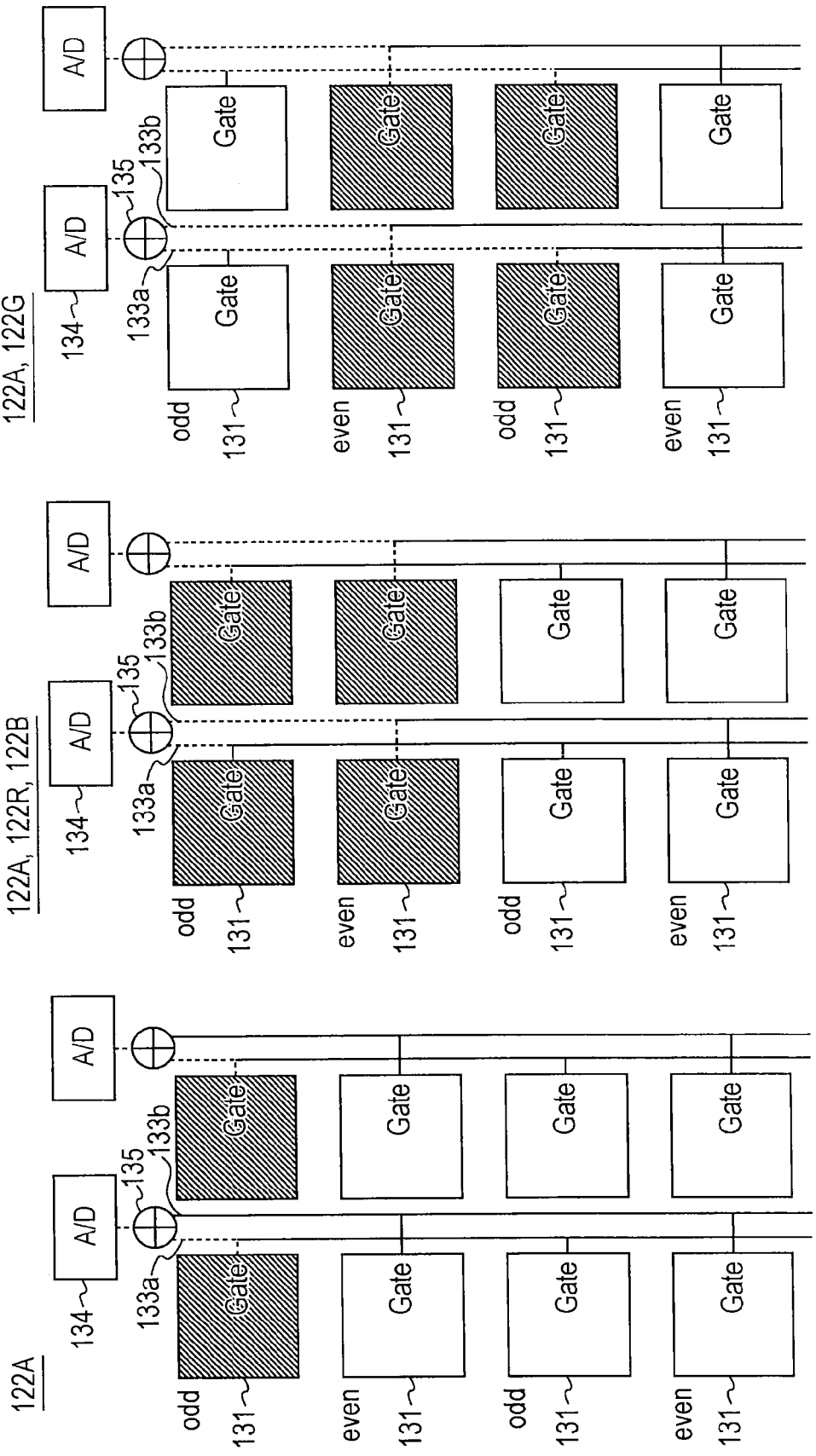

IMAGING APPARATUS AND IMAGING METHOD FOR PERFORMING INTERPOLATION PROCESSING

CROSS REFERENCE TO RELATED APPLICATIONS

This application claims the benefit of Japanese Priority Patent Application JP 2013-229011 filed Nov. 5, 2013, the entire contents of which are incorporated herein by reference.

BACKGROUND

The present technology relates to an imaging apparatus and a method of controlling the imaging apparatus, particularly to a three-sensor type imaging apparatus using image sensors having a two-line addition function.

In the related art, various imaging apparatuses that allow a high frame rate imaging have been proposed. For example, in Japanese Unexamined Patent Application Publication No. 2010-268354, a technology is disclosed, which allows a high frame rate imaging by mixing two pixels which are vertically adjacent to each other such that the pixel array after the mixing has a checkerboard pattern. In Japanese Unexamined Patent Application Publication No. 61-184057, in a three-sensor type imaging apparatus, a technology is disclosed, in which a horizontal resolution can be increased by disposing an image sensor for an image of green so as to be shifted in a horizontal direction by half a pixel interval with respect to image sensors for images of red and blue, and performing pixel interpolation processing.

SUMMARY

It is desirable to provide a three-sensor type imaging apparatus capable of performing a high frame rate imaging excellently.

According to an embodiment of the present technology, there is provided an imaging apparatus that includes: an imaging unit that includes image sensors for each image of red, green, and blue which have a two-line addition function respectively, in which the imaging unit outputs image signals of red and blue and an image signal of green of which sample phases in a space are shifted by one pixel interval in a vertical direction using the two-line addition function. The imaging apparatus further includes a resolution conversion unit that obtains image signals of red, green, and blue of which the number of lines is doubled by performing interpolation processing on the image signals of red and blue and an image signal of green output from the imaging unit.

In the embodiment of the present technology, the imaging apparatus includes the imaging unit having image sensors for each image of red, green, and blue which have a two-line addition function. From the imaging unit, the image signals of red and blue and an image signal of green of which the sample phases in the space are shifted by one pixel interval in a vertical direction using the two-line addition function are output.

For example, the imaging unit may enable the image signals of red and blue and the image signal of green to be output, of which the sample phases in the space are shifted by one pixel interval in the vertical direction by shifting the attachment positions of the image sensors for each image of red and blue and the image sensor for the image of green to a prism by one pixel interval in the vertical direction. In this case, for example, the image sensor may be a CMOS image sensor, and the image sensor may have one vertical reading line between each pixel in a horizontal direction, and may have an adder circuit between the two pixels in the vertical direction in the two lines to be added, which adds the output signals of the two pixels and supplies the sum signal to the vertical reading line.

In addition, for example, the imaging unit may enable the image signals of red and blue and the image signal of green to be output, of which the sample phases in the space are shifted by one pixel interval in the vertical direction by changing the combination of two lines to be added, in the image sensors for each image of red and blue and the image sensor for the image of green.

From the resolution conversion unit, the image signals of red, green, and blue of which the number of lines is doubled by performing the interpolation processing on the image signals of red and blue and the image signal of green output from the imaging unit, can be obtained. In the interpolation processing, the brightness resolution in the vertical direction decreased by the two-line addition can be increased. For example, the resolution conversion unit may obtain the image signals of red, green, and blue of which the number of lines is doubled by adding mixed signals of high-frequency signal components of each color to low-frequency signal components of each color, after making the number of lines twice by performing a filtering process in the vertical direction on each of the pixel signals of red, blue, and green obtained by the imaging unit.

In the embodiment of the present technology as described above, the image signals of red and blue and the image signal of green of which the sample phases in the space are shifted by one pixel interval in the vertical direction using the two-line addition function are output, and the image signals of red, green, and blue of which the number of lines is doubled by performing the interpolation processing on the above output image signals are obtained. Therefore, the high frame rate imaging can be achieved, in which the decrease of sensitivity, S/N, and the vertical brightness resolution is suppressed.

In the embodiment of the present technology, for example, in the imaging apparatus, it may be possible to select a normal frame rate imaging mode and a high frame rate imaging mode. When the high frame rate imaging mode is selected, the imaging unit may output the image signals of red and blue and the image signal of green of which the sample phases in the space are shifted by one pixel interval in the vertical direction using the two-line addition function, and when the high frame rate imaging mode is selected, the resolution conversion unit may obtain the image signals of red, green, and blue of which the number of lines is doubled by performing the interpolation processing on the image signals of red and blue and the image signal of green output from the imaging unit.

In addition, in the embodiment of the present technology, the imaging apparatus may further include a signal processing unit that processes the image signals of red, green, and blue obtained by the resolution conversion unit and outputs the output image signals of red, green, and blue.

According to the present technology, it is possible to provide a three-sensor type imaging apparatus capable of performing a high frame rate imaging excellently. The advantageous effects disclosed herein are merely examples, and are not intended to be limited thereto, and there may be additional effects as well.

BRIEF DESCRIPTION OF THE DRAWINGS

FIG. 5 is a block diagram illustrating an example of a circuit configuration of a camera;

FIGS. 7A and 7B are diagrams for explaining operations of a camera in a normal frame rate imaging mode and a high frame rate imaging mode;

FIGS. 9A to 9C are diagrams for explaining operations of image sensors in a normal frame rate imaging mode and a high frame rate imaging mode.

DETAILED DESCRIPTION OF EMBODIMENTS

Hereinafter, an embodiment of the present technology (hereinafter, refer to as "embodiment") will be described. The description will be made in the following order.
1. Embodiment
2. Modification example

1. Embodiment

Configuration of Camera

Figure 1:
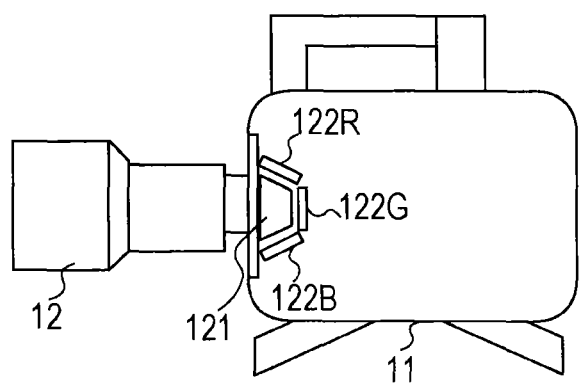
FIG. 1 is a diagram schematically illustrating a camera as an embodiment.

FIG. 1 schematically illustrates a camera 10 as an embodiment. The camera 10 is formed of a camera main body 11 and an imaging lens 12 which is mounted on the camera main body 11. The camera 10 is capable of selecting a normal frame rate imaging mode and a high frame rate imaging mode of which a frame rate is twice the rate in the normal frame rate imaging mode. The user can perform a mode selection by operating a user operation unit (not illustrated).

In the camera main body 11, at the position corresponding to the position on which the imaging lens 12 is mounted, a prism 121 that splits incident light into red, green, and blue light is provided. CMOS image sensors 122R, 122G, and 122B for each image of red, green, and blue are attached to the prism 121. In this case, the attachment positions of CMOS image sensors 122R and 122B, and the image sensor 122G to the prism 121 are shifted by one pixel interval in the vertical direction.

Figure 2:
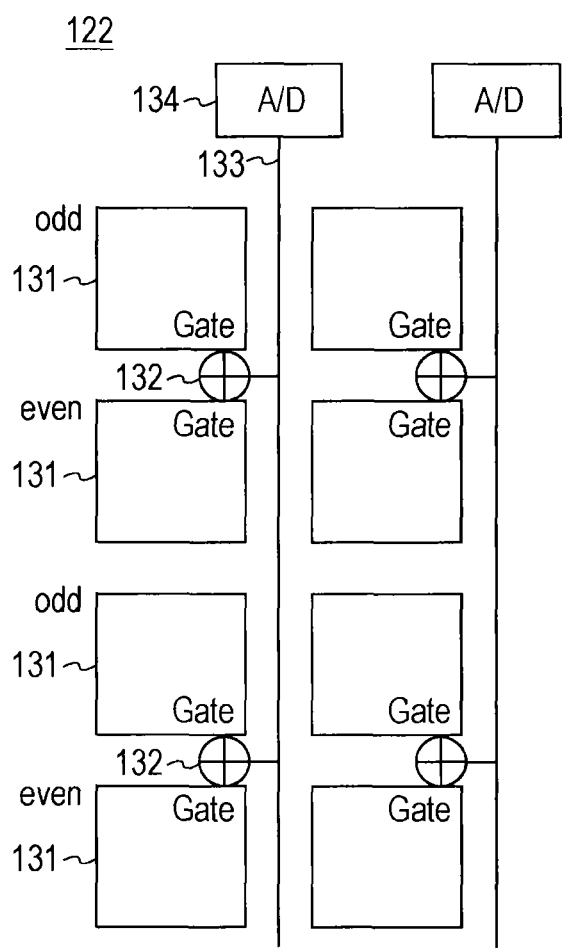
FIG. 2 is a diagram illustrating an example of a structure of an image sensor.

FIG. 2 illustrates an example of a structure of the image sensor 122 (122R, 122G, and 122B). Light reception units (photodiodes) 131 for obtaining pixel signals of each line are arrayed in the horizontal direction. The image sensor 122 has a two-line addition function. That is, the image sensor 122 has a reading line 133 between each light reception unit 131 in the horizontal direction, which extends in the vertical direction, and has an adder circuit 132 between the light reception units 131 of an odd-line and an even-line adjacent to each other in the vertical direction. The output of the adder circuit 132 is supplied to an A/D conversion circuit 134 via the reading line 133.

Figure 3A:
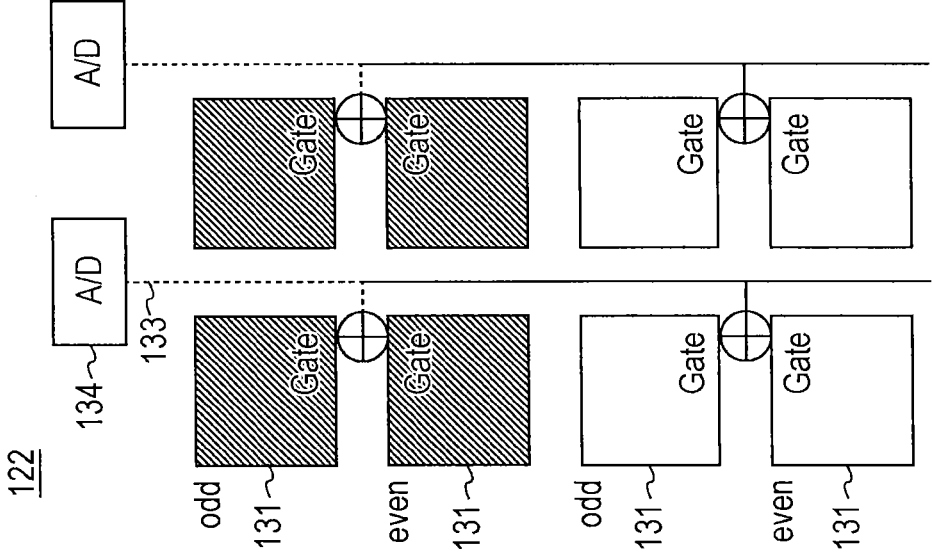
FIGS. 3A and 3B are diagrams for explaining operations of an image sensor in a normal frame rate imaging mode and a high frame rate imaging mode.
Figure 3B:
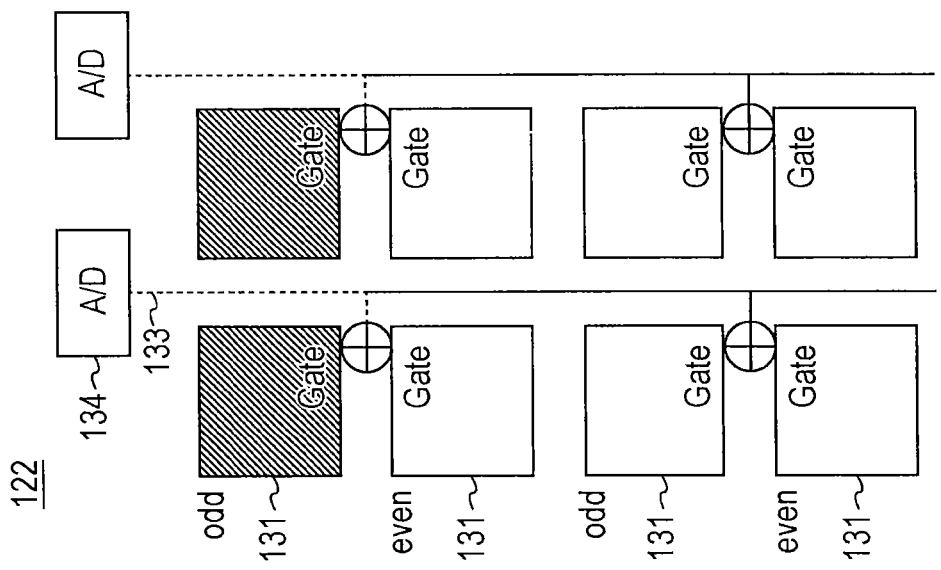

In the normal frame rate imaging mode, as illustrated in FIG. 3A, a gate of each light reception unit 131 is controlled to be opened for each line, and thus, the pixel signal of each line is sequentially output. On the other hand, in the high frame rate imaging mode, as illustrated in FIG. 3B, the gate of each light reception unit 131 is controlled to be opened for each of the two lines, and thus, the pixel signal of each line after adding two lines is sequentially output.

In a case of the high frame rate imaging mode, the frame rate is twice the rate in a case of the normal frame rate imaging mode. However, since the two-line addition is performed, the number of lines is half the number in the case of the high frame rate imaging mode. As a result, the A/D conversion circuit 134 can perform the A/D conversion within the same time as in the case of the normal frame rate imaging mode. In addition, in the case of the high frame rate imaging mode, the frame rate is twice the rate in the case of the normal frame rate imaging mode, and thus, exposure time of each light reception unit 131 is half the time in the case of the normal frame rate imaging mode. However, since the two-line addition is performed, there is no decrease in sensitivity and an S/N.

Figure 4A:
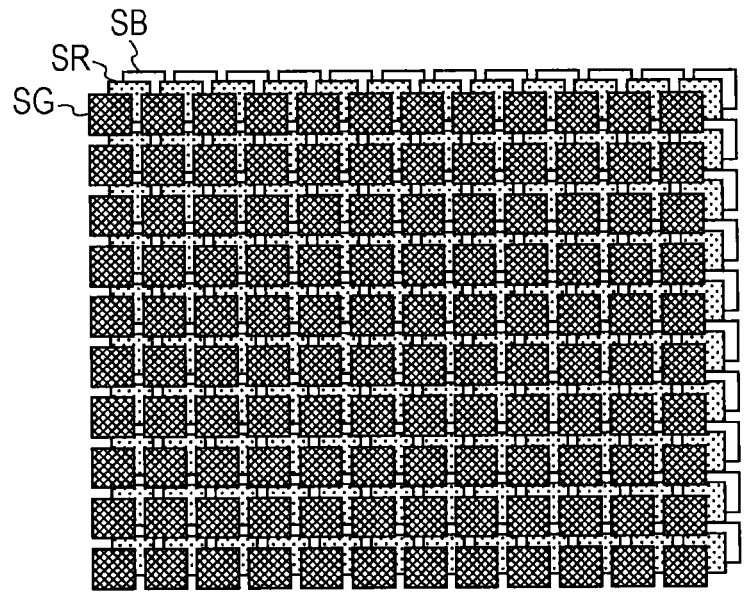
FIGS. 4A and 4B are diagrams illustrating a sample phase of image signals of red, green, and blue in the space in a normal frame rate imaging mode and a high frame rate imaging mode.

FIG. 4A illustrates a sample phase of image signals SR, SG, and SB of red, green, and blue output from the image sensors 122R, 122G, and 122B in the space in a normal frame rate imaging mode. In this mode, the image sensors 122R, 122G, and 122B are in a state of reading all the pixels, the sample phases of image signals SR, SG, and SB in the space coinciding with each other.

As described above, the attachment positions of image sensors 122R and 122B, and the image sensor 122G to the prism 121 are shifted by one pixel interval in the vertical direction. However, for example, effectively using a margin pixel of the image sensor, by reading only the image sensor 122G with shifting one line, it is possible to cause the sample phases of image signals SR and SB, and the image signal SG in the space to coincide with each other.

Figure 4B:
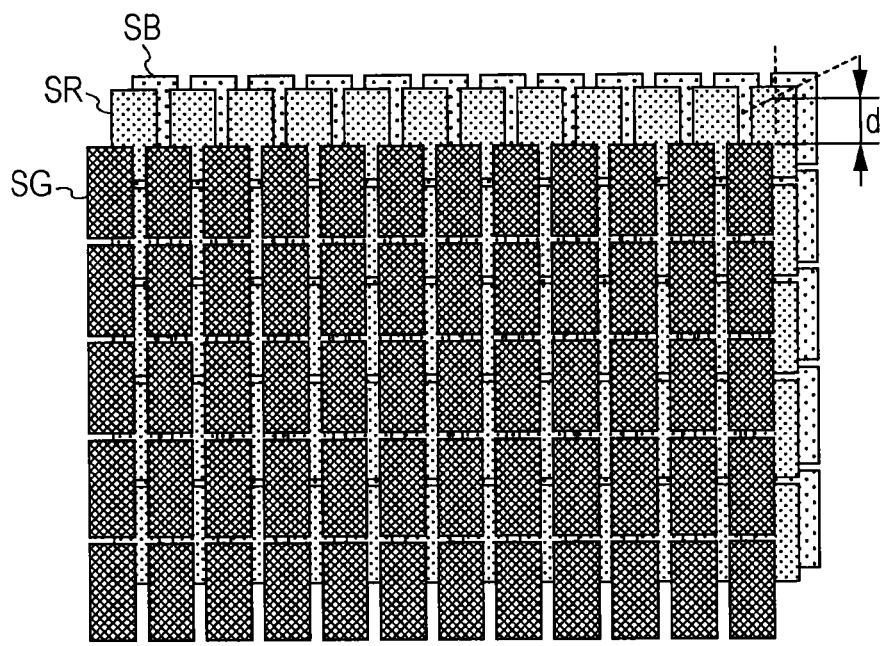

FIG. 4B illustrates a sample phase of image signals SR, SG, and SB of red, green, and blue output from the image sensors 122R, 122G, and 122B in the space in the high frame rate imaging mode. In this mode, the image sensors 122R, 122G, and 122B are in a state of reading the line addition. As described above, the attachment positions of image sensors 122R and 122B, and the image sensor 122G to the prism 121 are shifted by one pixel interval in the vertical direction. As a result, the sample phases of image signals SR and SB of red and blue, and the image signal SG of green in the space are the same with respect to the horizontal direction, but are shifted by one pixel interval d with respect to the vertical direction.

FIG. 5 illustrates an example of a circuit configuration of the camera 10. The camera 10 includes a control unit 141, an imaging unit 142, a resolution conversion unit 143, and a camera signal processing unit 144. The control unit 141 controls the operation of each unit of the camera 10. The imaging unit 142 includes the above-described image sensors 122R, 122G, and 122B of red, green, and blue respectively, and outputs the image signals SR, SG, and SB of red, green, and blue respectively.

In the high frame rate imaging mode, as described above, since the two-line addition is performed, the number of lines (the number of pixels in the vertical direction) of the image signals SR, SG, and SB is half the number of lines (the number of pixels in the vertical direction) in the normal frame rate imaging mode. In addition, in the normal frame rate imaging mode, the sample phases of the image signals SR, SG, and SB in the space coincide with each other. However, in the high frame rate imaging mode, the sample phases of the image signals SR, SB of red and blue, and the image signal SG of green in the space are shifted by one pixel interval in the vertical direction.

In the normal frame rate imaging mode, the resolution conversion unit 143 outputs the image signals SR, SG, and SE of red, green, and blue output from the imaging unit 142 as they are. In addition, in the high frame rate imaging mode, the resolution conversion unit 143 performs interpolation processing on the image signals SR, SG, and SB of red, green, and blue output from the imaging unit 142, and then, generates the image signals SR', SG', and SB' of red, green, and blue having twice the number of lines. In the interpolation processing, using the fact that the sample phases of the image signals SR, SB of red and blue, and the image signal SG of green output from the imaging unit 142 in the space are shifted by one pixel interval in the vertical direction, increasing of the brightness resolution in the vertical direction is performed, which is decreased by the two-line addition. The detailed configuration of the resolution conversion unit 143 in the high frame rate imaging mode will be described below.

The camera signal processing unit 144 processes the image signals of red, green, and blue (SR, SG, and SB in the normal frame rate imaging mode and SR', SG', and SB' in the high frame rate imaging mode) output from the resolution conversion unit 143, and outputs image signals SRo, SGo, and SBo of red, green, and blue as outputs of the camera 10. The camera signal processing unit 144 performs, for example, a gain control, an adjustment of a white balance, and a gamma correction. Here, the frame rate of the output image signals SRo, SGo, and SBo in the high frame rate imaging mode is twice the rate in the normal frame rate imaging mode.

Figure 6:
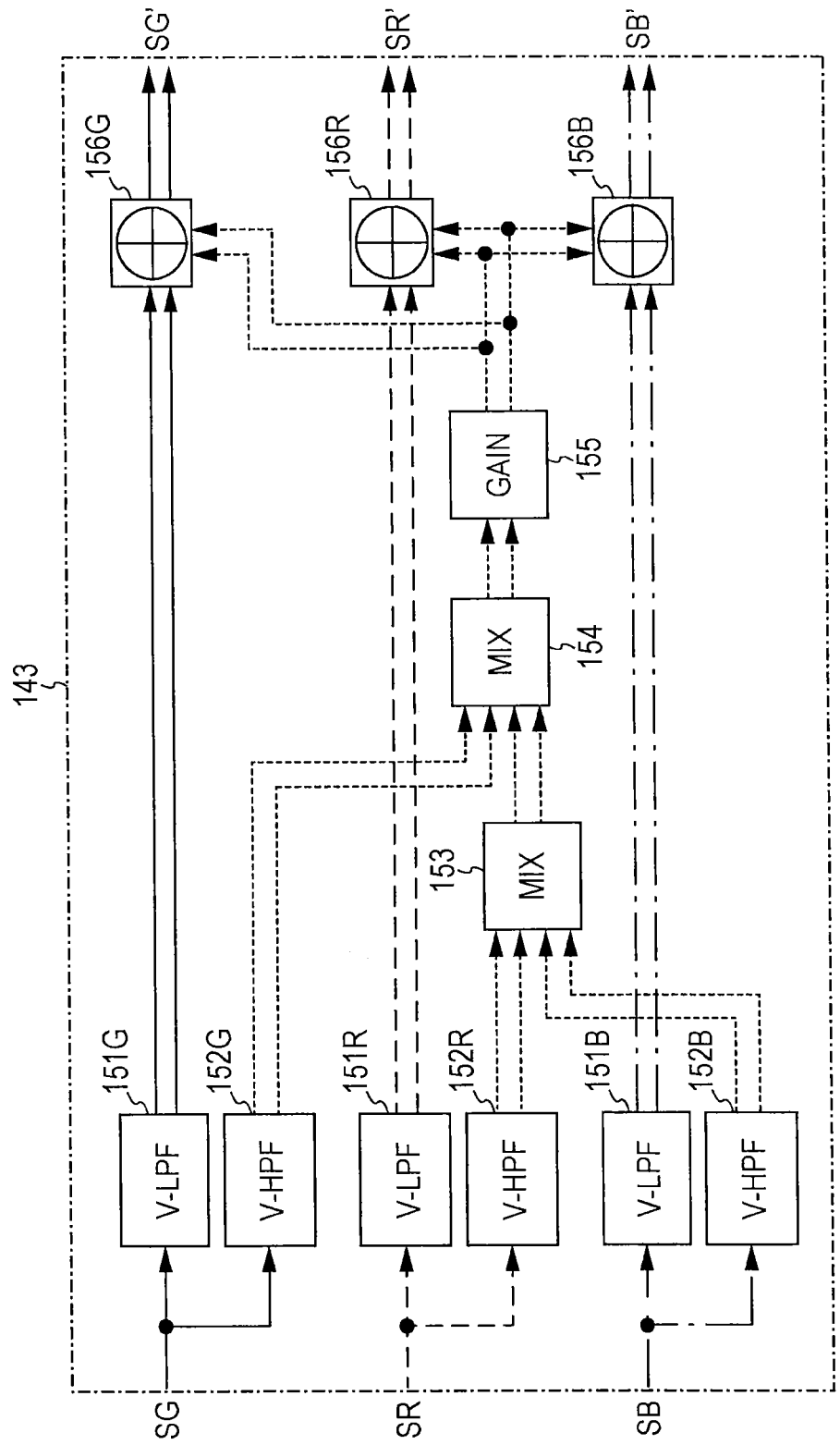
FIG. 6 is a diagram illustrating a configuration example of a resolution conversion unit in a high frame rate imaging mode.

FIG. 6 illustrates a configuration example of a resolution conversion unit 143 in the high frame rate imaging mode. The resolution conversion unit 143 includes vertical low pass filter sections 151G, 151R, and 151B, vertical high pass filter sections 152G, 152R, and 152B, mixing sections 153 and 154, a gain section 155, and addition sections 156G, 156R, and 156B.

The vertical low pass filter sections 151G, 151R, and 151B perform vertical filtering processing with respect to the input image signals SG, SR, and SB respectively, and generate a low-frequency signal component in which the interpolation is performed between the lines. In this case, since the interpolation is performed between the lines, as illustrated in FIG. 6, the number of lines is doubled. The vertical high pass filter sections 152G, 152R, and 152B perform the vertical filtering processing with respect to the input image signals SG, SR, and SB respectively, and generate a high-frequency signal component in which the interpolation is performed between the lines. In this case, since the interpolation is performed between the lines, as illustrated in FIG. 6, the number of lines becomes twice.

The mixing section 153 mixes the high-frequency signal component of red generated by the vertical high pass filter section 152R and the high-frequency signal component of blue generated by the vertical high pass filter section 152B. In addition, the mixing section 154 mixes the high-frequency signal component of green generated by the vertical high pass filter section 152G and the high-frequency signal component obtained in the mixing section 153. In this way, from the mixing section 154, a high-frequency signal component in which the high-frequency signal component of red, blue, and green are mixed is obtained.

The gain section 155 controls a gain of the high-frequency signal component obtained in the mixing section 154 to be a predetermined value. The addition sections 156G, 156R, and 156B add the high-frequency signal component which is gain controlled by the gain section 155 to the low-frequency signal components of green, red, and blue generated in the vertical low pass filter sections 151G, 151R, and 151B, respectively, and generate output image signals SG', SR', and SB' of green, red, and blue. The number of lines of the output image signals SG', SR', and SB' become twice by the interpolation processing with respect to the input image signals SG, SR, and SB respectively. In addition, by the interpolation processing, the increasing of the brightness resolution in the vertical direction which is decreased by the two-line addition, is performed.

The operation of the camera 10 illustrated in FIG. 5 will be described. First, the operation in the normal frame rate imaging mode will be described referring to FIG. 7A. With the imaging unit 142 being in a state of reading all the pixels, in the normal number of lines and in the normal frame rate, the image signals SR, SG, and SB of red, blue, and green of which the sample phases in the space coincide with each other can be obtained.

The image signals SR, SG, and SB of red, green, and blue obtained by the imaging unit 142 pass through the resolution conversion unit 143 in an intact state, and are sent to the camera signal processing unit 144. In the camera signal processing unit 144, with respect to the image signals SR, SG, and SB, for example, processing tasks of a gain control, adjustment of the white balance, and gamma correction are performed, and then, the output image signals SRo, SGo, and SBo of red, green, and blue are obtained.

For example, in the normal frame rate imaging mode, the image signals SR, SG, and SB having the resolution of "1920×1080" and the frame rate of "F" can be obtained from the imaging unit 142, and the output image signals SRo, SGo, and SBo having the resolution of "1920×1080" and the frame rate of "F" are output from the camera signal processing unit 144.

Next, the operation in the high frame rate imaging mode will be described referring to FIG. 7B. The imaging unit 142 is in a state of reading the line addition, and image signals SR, SG, and SB of red, green, and blue can be obtained in the number of lines half the number in the normal mode and in the frame rate twice the rate in the normal mode. In this case, the sample phases of the image signals SR and SB of red and blue and the image signal SG of green in the space are shifted by one pixel interval in the vertical direction.

The image signals SR, SG, and SB of red, green, and blue obtained in the imaging unit 142 are sent to the resolution conversion unit 143. In the resolution conversion unit 143, the interpolation processing is performed on each of the image signals SR, SG, and SB, and then, the image signals SR', SG', and SB' of which the number of lines becomes twice are generated. In this case, the image signals SR', SG', and SB' are generated by adding the mixed signal of the high-frequency signal component of each color to the low-frequency signal component of each color. Therefore, the brightness resolution in the vertical direction decreased by the two-line addition in the image sensor is increased.

The image signals SR', SG', and SB' of red, green, and blue generated by the resolution conversion unit 143 are sent to the camera signal processing unit 144. In the camera signal processing unit 144, for example, processing tasks of a gain control, adjustment of the white balance, and gamma correction are performed with respect to the image signals SR', SG', and SB', and then, the output image signals SRo, SGo, and SBo of red, green, and blue can be obtained.

For example, in the high frame rate imaging mode, the image signals SR, SG, and SB having the resolution of "1920×540" and the frame rate of "2F" can be obtained from the imaging unit 142, and the output image signals SRo, SGo, and SBo having the resolution of "1920×1080" and the frame rate of "2F" are output from the camera signal processing unit 144.

As described above, in the camera 10 illustrated in FIG. 1, in the high frame rate imaging mode, using the two-line addition function of the CMOS image sensor, the image signals SR, SB of red and blue, and the image signal SG of green of which the sample phases in the space are shifted by one pixel interval in a vertical direction having a frame rate doubled are obtained, and the interpolation processing is performed on those image signals and the number of lines is doubled, and then, the image signals SR', SG', and SB' of red, green, and blue are obtained, in which the brightness resolution in the vertical direction decreased by the two-line addition in the image sensor is increased. As a result, the high frame rate imaging becomes possible, in which the decrease of the sensitivity, the S/N, and the vertical brightness resolution are suppressed.

In addition, in the camera 10 illustrated in FIG. 1, by the attachment positions of image sensors 122R and 122B for each image of red and blue, and the image sensor 122G for the image of green to the prism 121 being shifted by one pixel interval in the vertical direction, the image signals SR, SB of red and blue, and the image signal SG of green are obtained, in which the sample phases in the space are shifted by one pixel interval in the vertical direction. Then, each image sensor has one vertical reading line 133 between the light reception units of each pixel in the horizontal direction, and has an adder circuit 132 that adds the output signals of the light reception units of the two pixels and supplies the sum signal to the vertical reading line 133, between the light reception units of the two pixels in the vertical direction in the two lines to be added in the horizontal direction. Since an image sensor has one vertical reading line 133 between the light reception units of each pixel in the vertical direction, it is possible to suppress the decrease of a size of the light reception unit of each pixel. Therefore, it is possible to suppress the decrease of the sensitivity.

2. Modification Example

In the embodiment described above, by the attachment positions of image sensors 122R and 122D for each image of red and blue, and the image sensor 122G for the image of green to the prism 121 being shifted by one pixel interval in the vertical direction, the image signals SR, SB of red and blue, and the image signal SG of green are obtained, in which the sample phases in the space are shifted by one pixel interval in the vertical direction.

However, without shifting the attachment positions of image sensors 122R and 122B for each image of red and blue, and the image sensor 122G for the image of green to the prism 121 by one pixel interval in the vertical direction, the image signals SR, SB of red and blue, and the image signal SG of green can be obtained, in which the sample phases in the space are shifted by one pixel interval in the vertical direction. In this case, in the image sensors 122R and 122B for each image of red and blue and the image sensor 122G for the image of green, a combination of the two lines to be added is changed.

Figure 8:
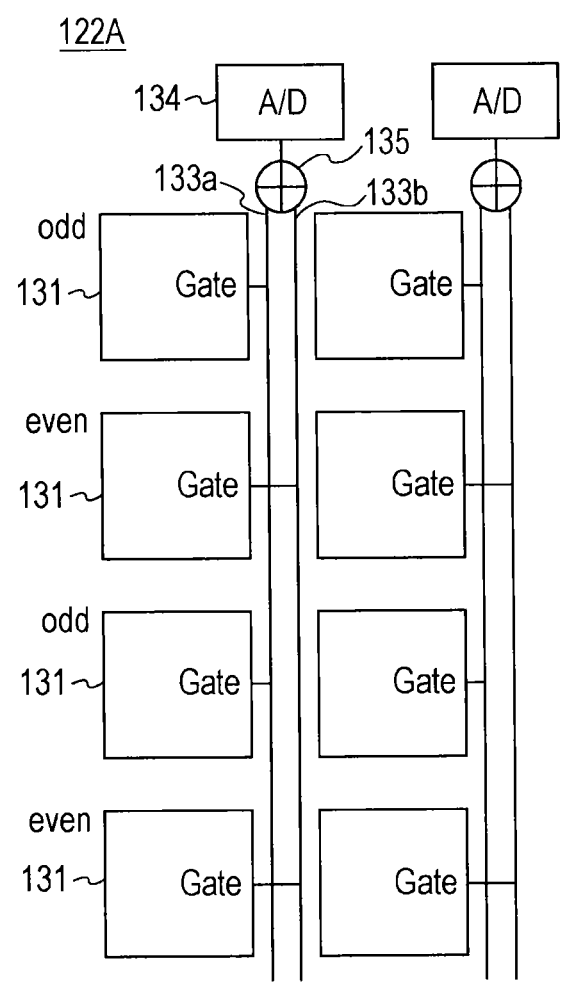
FIG. 8 is a diagram illustrating an example of another structure of an image sensor.

FIG. 8 illustrates an example of a structure of an image sensor 122A (122R, 122G, and 122B) in the above-described case. The light reception units (photodiodes) 131 for obtaining the pixel signal of each line are arrayed in the horizontal direction. The image sensor 122A has a two-line addition function, and the combination of added two lines can be changed.

That is, the image sensor 122A has two vertically extended reading lines 133a and 133b between each horizontal light reception unit 131, and has the adder circuit 135 between the two lines 133a and 133b. The output of the adder circuit 135 is supplied to the A/D conversion circuit 134. The output of the light reception unit 131 in an odd line is supplied to the reading line 133a and the output of the light reception unit 131 in an even line is supplied to the reading line 133b.

In the normal frame rate imaging mode, as illustrated in FIG. 9A, the gate of each light reception unit 131 is controlled to be opened for each line, and thus, the pixel signal of each line is sequentially output. On the other hand, in the high frame rate imaging mode, as illustrated in FIGS. 9B and 9C, the gate of each light reception unit 131 is controlled to be opened for each of the two lines, and thus, the pixel signal of each line after adding two lines is sequentially output.

For example, FIG. 9B illustrates image sensor 122A (122R and 122B) for each image of red and blue and FIG. 9C illustrates the image sensor 122A (122G) for the image of green, and the combination of the two lines to be added is changed. In this way, the image signals SR and SB of red and blue and the image signal SG of green are obtained, of which the sample phases in the space are shifted by one pixel interval in the vertical direction.

In the case of the high frame rate imaging mode, the frame rate is twice the rate in the normal frame rate imaging mode. However, since the two-line addition is performed, the number of lines is half the number in the normal frame rate imaging mode. As a result, the A/D conversion circuit 134 can perform the A/D conversion within the same time as in the case of normal frame rate imaging mode. In addition, in the high frame rate imaging mode, the frame rate is twice the rate in the normal frame rate imaging mode and the exposure time of each light reception unit 131 is half the time in the normal frame rate imaging mode. However, since the two-line addition is performed, there is no decrease in the sensitivity and the S/N.

In addition, the present technology may have a configuration as described below.

(1) An imaging apparatus includes: an imaging unit that includes image sensors for each image of red, green, and blue which have a two-line addition function respectively, in which the imaging unit outputs image signals of red and blue and an image signal of green of which sample phases in a space are shifted by one pixel interval in a vertical direction using the two-line addition function, and in which the imaging apparatus further includes a resolution conversion unit that obtains image signals of red, green, and blue of which the number of lines is doubled by performing interpolation processing on the image signals of red and blue and an image signal of green output from the imaging unit.

(2) The imaging apparatus according to above (1), in which the imaging unit enables the image signals of red and blue and the image signal of green to be output, of which the sample phases in the space are shifted by one pixel interval in the vertical direction by shifting the attachment positions of the image sensors for each image of red and blue and the image sensor for the image of green to a prism by one pixel interval in the vertical direction.

(3) The imaging apparatus according to above (2), in which the image sensor is a CMOS image sensor, and in which the image sensor has one vertical reading line between the light reception units of each pixel in a horizontal direction, and has an adder circuit between the light reception units of the two pixels in the vertical direction in the two lines to be added, which adds the output signals of the light reception units of the two pixels and supplies the sum signal to the vertical reading line.

(4) The imaging apparatus according to above (1), in which the imaging unit enables the image signals of red and blue and the image signal of green to be output, of which the sample phases in the space are shifted by one pixel interval in the vertical direction by changing the combination of two lines to be added, in the image sensors for each image of red and blue and the image sensor for the image of green.

(5) The imaging apparatus according to any one of above (1) to (4), in which the resolution conversion unit obtains the image signals of red, green, and blue of which the number of lines is doubled by adding mixed signals of high-frequency signal components of each color to low-frequency signal components of each color, after making the number of lines twice by performing a filtering process in the vertical direction on each of the pixel signals of red, blue, and green obtained by the imaging unit.

(6) The imaging apparatus according to any one of above (1) to (5), in which it is possible to select a normal frame rate imaging mode and a high frame rate imaging mode, in which, when the high frame rate imaging mode is selected, the imaging unit outputs the image signals of red and blue and the image signal of green of which the sample phases in the space are shifted by one pixel interval in the vertical direction using the two-line addition function, and in which, when the high frame rate imaging mode is selected, the resolution conversion unit obtains the image signals of red, green, and blue of which the number of lines is doubled by performing the interpolation processing on the image signals of red and blue and the image signal of green output from the imaging unit.

(7) The imaging apparatus according to any one of above (1) to (6), further including a signal processing unit that processes the image signals of red, green, and blue obtained by the resolution conversion unit and outputs the output image signals of red, green, and blue.

(8) A method of controlling an imaging apparatus which includes an imaging unit having image sensors for each image of red, green, and blue which have a two-line addition function respectively, and a resolution conversion unit, the method including: controlling such that the imaging unit outputs image signals of red and blue and an image signal of green of which the sample phases in the space are shifted by one pixel interval in a vertical direction using the two-line addition function; and controlling such that the resolution conversion unit obtains image signals of red, green, and blue of which the number of lines is doubled by performing interpolation processing on the image signals of red and blue and an image signal of green output from the imaging unit.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   imaging circuitry, including image sensors for each image of red, green, and blue which respectively have a vertical reading line between light reception sensors of each pixel in a horizontal direction and an adder circuit between the light reception sensors of two pixels in a vertical direction in two lines to be added, the adder circuit adding output signals of the light reception sensors of the two pixels and supplying a sum signal to the vertical reading line, the image circuitry being configured to output image signals of red and blue and an image signal of green of which sample phases in a space are shifted by one pixel interval in the vertical direction; and
   resolution conversion circuitry configured to obtain image signals of red, green, and blue of which a number of lines is doubled by performing interpolation processing on the image signals of red and blue and an image signal of green output from the imaging circuitry.

2. The imaging apparatus according to claim 1,
   wherein the imaging circuitry enables the image signals of red and blue and the image signal of green to be output, of which the sample phases in the space are shifted by one pixel interval in the vertical direction by shifting attachment positions of the image sensors for each image of red and blue and the image sensor for the image of green to a prism by one pixel interval in the vertical direction.

3. The imaging apparatus according to claim 2,
   wherein the image sensors are CMOS image sensors.

4. The imaging apparatus according to claim 1,
   wherein the imaging circuitry enables the image signals of red and blue and the image signal of green to be output, of which the sample phases in the space are shifted by one pixel interval in the vertical direction by changing the combination of two lines to be added, in the image sensors for each image of red and blue and the image sensor for the image of green.

5. An imaging apparatus comprising:
   imaging circuitry, including image sensors for each image of red, green, and blue which have a two-line addition function respectively, the image circuitry being configured to output image signals of red and blue and an image signal of green of which sample phases in a space are shifted by one pixel interval in a vertical direction using the two-line addition function; and
   resolution conversion circuitry configured to obtain image signals of red, green, and blue of which a number of lines is doubled by performing interpolation processing on the image signals of red and blue and an image signal of green output from the imaging circuitry,
   wherein the resolution conversion circuitry obtains the image signals of red, green, and blue of which the number of lines is doubled by adding mixed signals of high-frequency signal components of each of the image signals of red, green, and blue to low-frequency signal components of each of the image signals of red, green, and blue, after making the number of lines twice by performing a filtering process in the vertical direction on each of the pixel signals of red, blue, and green obtained by the imaging circuitry.

6. The imaging apparatus according to claim 1,
   wherein a normal frame rate imaging mode and a high frame rate imaging mode are selectable,
   wherein, when the high frame rate imaging mode is selected, the imaging circuitry outputs the image signals of red and blue and the image signal of green of which the sample phases in the space are shifted by one pixel interval in the vertical direction, and
   wherein, when the high frame rate imaging mode is selected, the resolution conversion circuitry obtains the image signals of red, green, and blue of which the number of lines is doubled by performing the interpolation processing on the image signals of red and blue and the image signal of green output from the imaging circuitry.

7. The imaging apparatus according to claim 1, further comprising:
   signal processing circuitry configured to process the image signals of red, green, and blue obtained by the resolution conversion circuitry and outputs the output image signals of red, green, and blue.

8. A imaging method comprising:

outputting, using imaging circuitry, image signals of red and blue and an image signal of green of which the sample phases in the space are shifted by one pixel interval in a vertical direction, the imaging circuitry including image sensors for each image of red, green, and blue which respectively have a vertical reading line between light reception sensors of each pixel in a horizontal direction and an adder circuit between the light reception sensors of two pixels in the vertical direction in two lines to be added, the adder circuit adding output signals of the light reception sensors of the two pixels and supplying a sum signal to the vertical reading line; and obtaining, using resolution conversion circuitry, image signals of red, green, and blue of which a number of lines is doubled by performing interpolation processing on the image signals of red and blue and an image signal of green output from the imaging circuitry.

* * * * *